(12) United States Patent
Latimer

(10) Patent No.: US 8,241,098 B1
(45) Date of Patent: Aug. 14, 2012

(54) ADJUSTABLE CONVEYOR ASSEMBLY FOR A COMBINE

(76) Inventor: Leslie B. Latimer, Seneca, IL (US)

( * ) Notice: Subject to any disclaimer, the term of this patent is extended or adjusted under 35 U.S.C. 154(b) by 0 days.

(21) Appl. No.: 13/106,526

(22) Filed: May 12, 2011

(51) Int. Cl.
*A01D 17/02* (2006.01)
*A01F 12/46* (2006.01)

(52) U.S. Cl. ........................................ 460/114; 198/313

(58) Field of Classification Search ................ 460/114; 198/311, 312, 313, 314, 315, 536, 860.1, 198/812; 414/502, 813
See application file for complete search history.

(56) References Cited

U.S. PATENT DOCUMENTS

| | | | | |
|---|---|---|---|---|
| 2,815,849 A * | 12/1957 | Zumbrunnen | | 198/812 |
| 3,826,353 A * | 7/1974 | Greasley | | 198/313 |
| 3,945,484 A * | 3/1976 | Oury | | 198/313 |
| RE29,110 E * | 1/1977 | Oury | | 198/314 |
| 4,037,565 A * | 7/1977 | Ledwell, Jr. | | 119/846 |
| 4,523,669 A * | 6/1985 | Smith | | 198/313 |
| 5,203,442 A * | 4/1993 | Oury et al. | | 198/313 |
| 5,307,917 A * | 5/1994 | Hall | | 198/313 |
| 5,498,119 A * | 3/1996 | Faivre | | 414/528 |
| 5,857,907 A * | 1/1999 | Underwood | | 460/114 |
| 6,012,272 A | 1/2000 | Dillon | | |
| 6,233,911 B1 | 5/2001 | Dillon | | |
| 6,247,581 B1 | 6/2001 | Oswald et al. | | |
| 6,339,917 B1 * | 1/2002 | Dillon et al. | | 56/14.6 |
| 6,594,979 B2 * | 7/2003 | Krone et al. | | 56/16.6 |
| 6,606,844 B2 | 8/2003 | Dillon et al. | | |
| 6,896,123 B1 * | 5/2005 | Horak | | 198/812 |
| 6,908,380 B2 | 6/2005 | Silver | | |
| 6,935,487 B2 * | 8/2005 | Schaum et al. | | 198/812 |
| 7,168,555 B2 * | 1/2007 | Peterson | | 198/812 |
| 7,213,717 B2 * | 5/2007 | Willim | | 212/299 |
| 7,766,158 B2 * | 8/2010 | Laganiere | | 198/812 |
| 7,909,153 B2 * | 3/2011 | Pogue | | 198/315 |
| 8,006,831 B1 * | 8/2011 | Mackin et al. | | 198/860.1 |

* cited by examiner

*Primary Examiner* — Arpad Fabian-Kovacs
(74) *Attorney, Agent, or Firm* — Montgomery Patent & Design, LLC; Robert C. Montgomery; Joseph Yaksich

(57) ABSTRACT

An adjustable conveyor assembly attachable to a harvesting combine includes a pair of telescoping conveyor sections providing a length adjustable conveyor for the conveyance of harvested materials being unloaded from a combine bin. The conveyors include a hydraulically motorized extension and conveyor belt drive as well as associated user controls. The conveyor is controlled by a control module located within the combine cab which provides user interface and programmable functions.

15 Claims, 10 Drawing Sheets

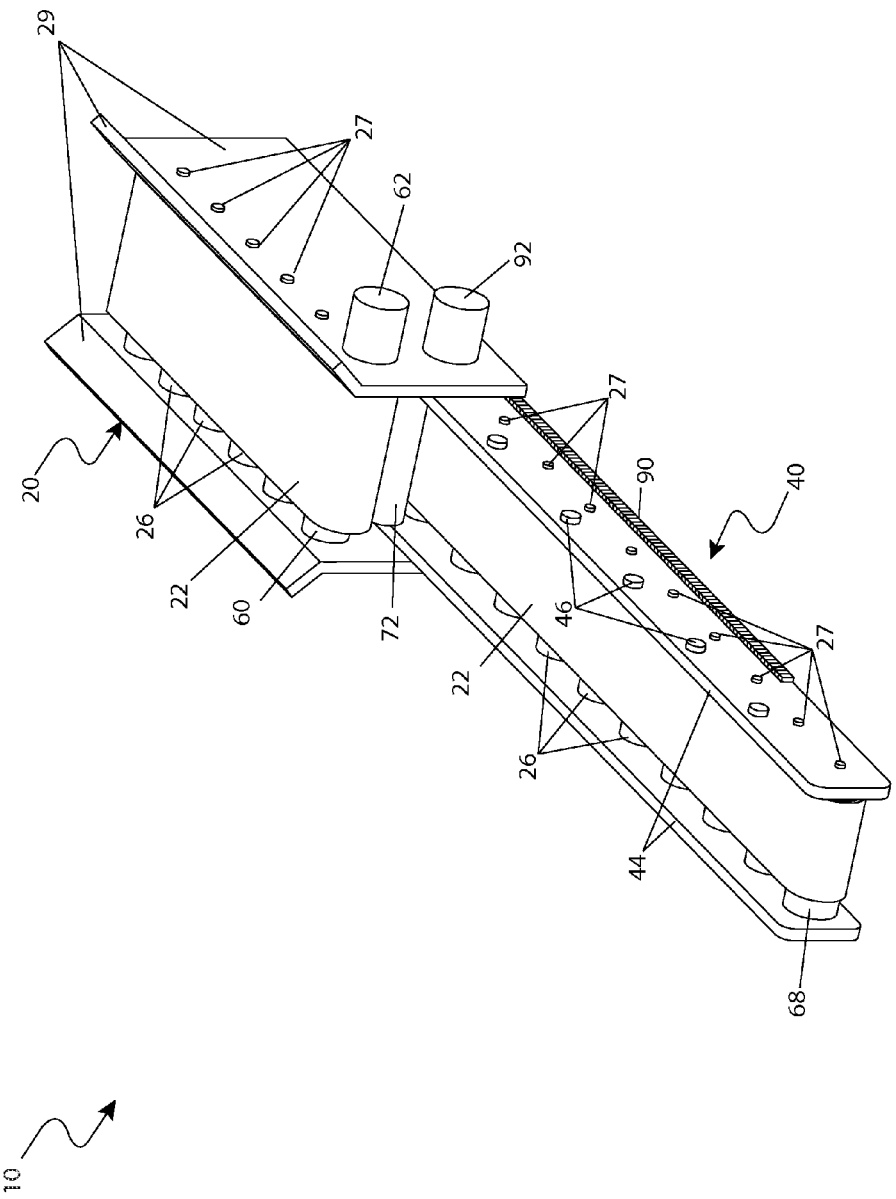

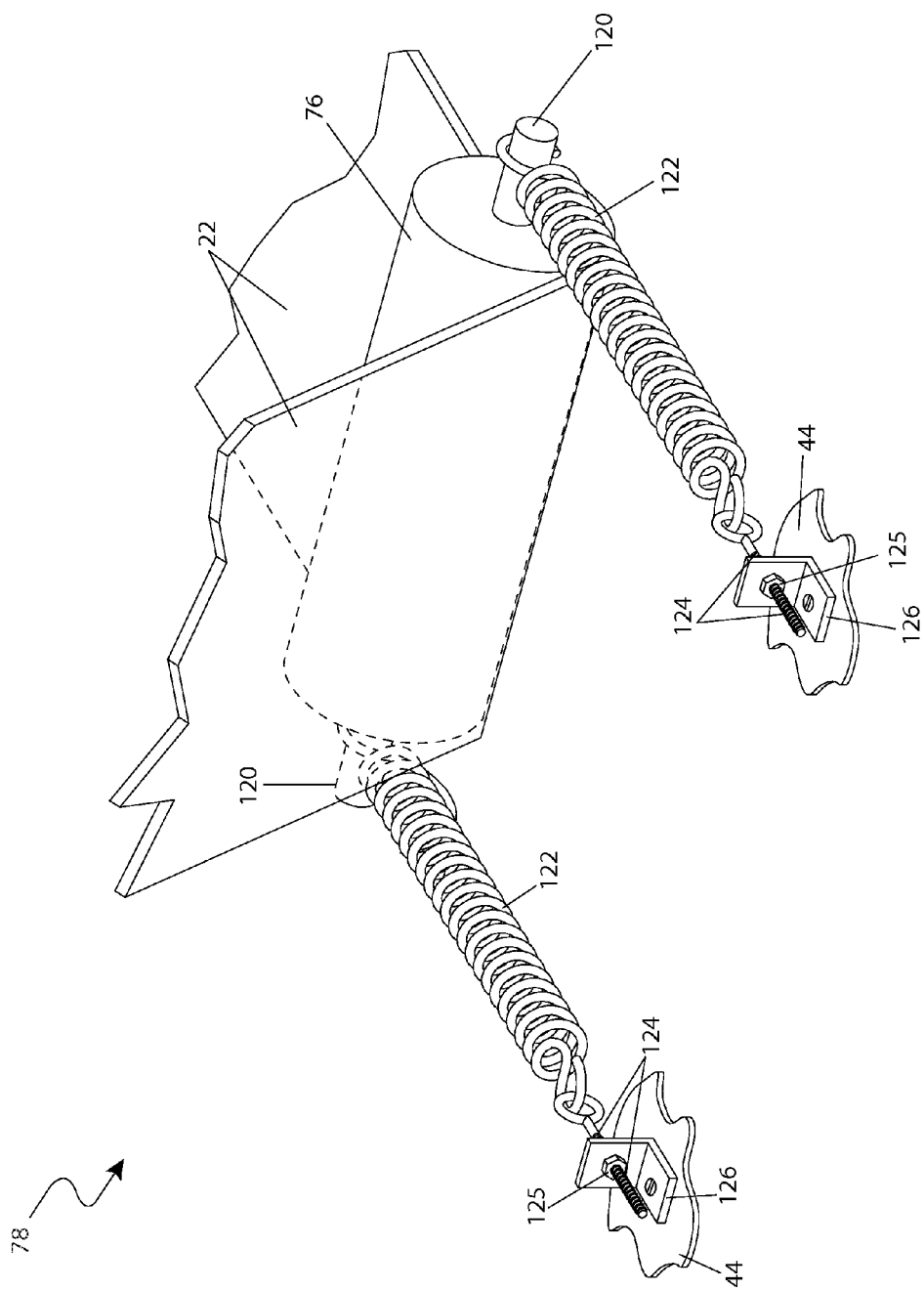

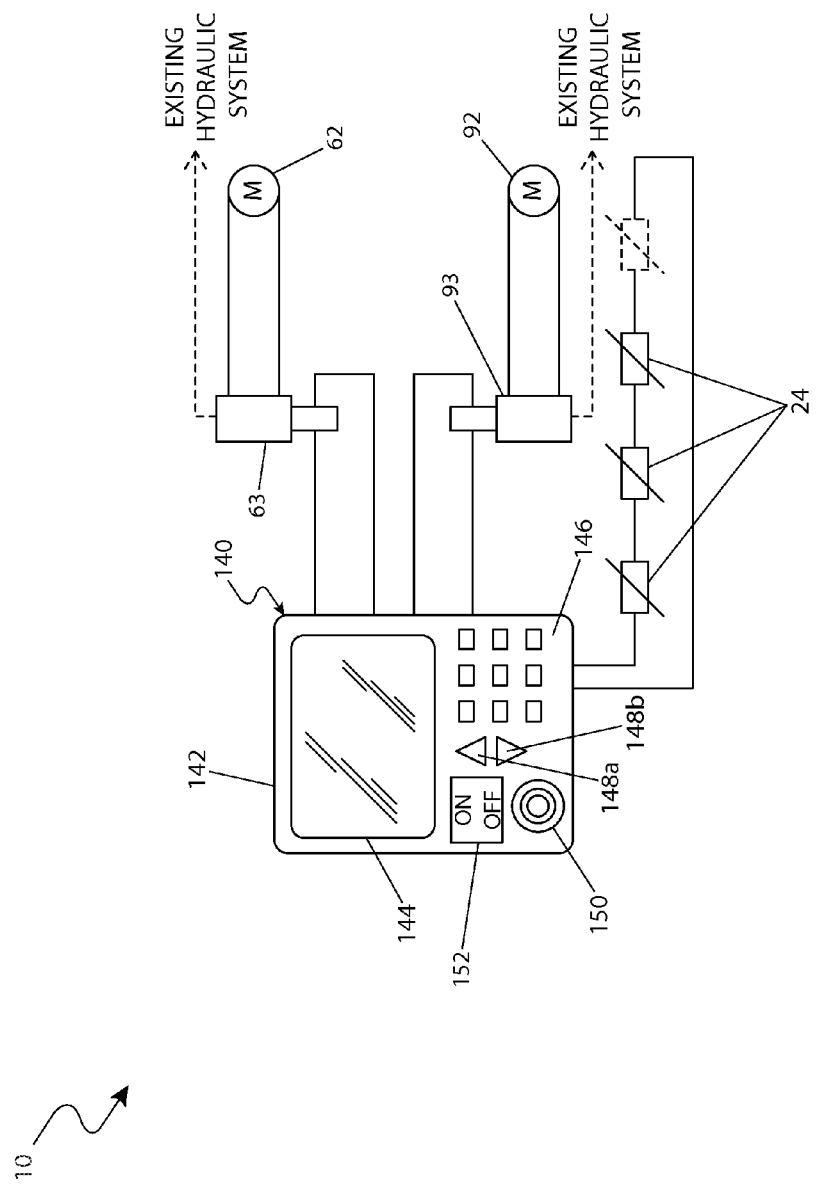

ADJUSTABLE CONVEYOR ASSEMBLY FOR A COMBINE

RELATED APPLICATIONS

The present invention was first described in a notarized Official Record of Invention on Feb. 23, 2010, that is on file at the offices of Montgomery Patent and Design, LLC, the entire disclosures of which are incorporated herein by reference.

FIELD OF THE INVENTION

The present invention relates generally to harvesting combines, and in particular, to an adjustable conveyor belt attachable to a combine having a telescoping conveyor assembly for unloading harvested material from a combine bin.

BACKGROUND OF THE INVENTION

The field of agriculture relies upon many different machines in order to provide efficiency and lower the cost of food production. Perhaps the most well-known of these machines is the combine, which is used to harvest various grains. After the grains are harvested they must be emptied from the combine bin to various offloading vehicles such as trailers. The conventional method of emptying the conveyor bid relies upon the use of an auger-based drive system which moves the harvested material along the rotational axis of the auger. While these systems have worked well for many years, they are not without significant disadvantages. First, the overall length of an auger-based system is fixed. This means that the offloading vehicles must always be located a specific distance away from the combine. As one can imagine, such distances are not always feasible based upon crop layout, field obstructions, and the like. This requires much jockeying of the combine to allow for a wide path, thus resulting in wasted time. Secondly, auger-based systems are difficult to fully empty due to their design and reliance upon other systems associated with the combine. This makes it exceedingly difficult to start up a full auger again in the future due to internal friction forces caused by the grain residing along the auger threading.

Various attempts have been made to provide improved combines and grain unloading devices; however, while these attempts may achieve their purported objective each suffers from one or more disadvantage or deficiency related to design or utilization. Particularly, none of these attempts effectively address the decreased production efficiency and operational control limitations provided by conventional mechanical harvesting techniques.

SUMMARY OF THE INVENTION

The inventor has therefore recognized the aforementioned inherent problems and lack in the art and observed that there is a need for an apparatus in which combine bins can be easily emptied without the disadvantages as described above. In accordance with the invention, it is an object of the present disclosure to solve these problems.

The inventor recognized these problems and has addressed this need by developing an attachable adjustable conveyor belt system for a combine that provides for vastly superior operation of a combine in a manner which is quick, easy, and effective without the multiple disadvantages of present auger-based systems. The inventor has thus realized the advantages and benefits of providing the adjustable conveyor assembly attachable to the combine having an elongated auger shaft disposed within a vertical auger housing of the combine. The shaft has a lower end mechanically coupled to an auger drive of the combine to move the harvested material upwardly. An enclosed fixed conveyor section is fastened to an upper end of the vertical auger housing to receive the harvested material and includes a conveyor roller track disposed on a lower edge of each opposing side. An adjustable conveyor section is slidingly attached to the fixed conveyor section and has a plurality of conveyor rollers protruding outwardly from opposing sides which are rotatably movable within the conveyor roller track as the adjustable conveyor section moves relative to the fixed conveyor section. A rack-and-pinion gear mechanism is provided between the fixed and adjustably conveyor sections for linearly moving the adjustable conveyor section relative to the fixed conveyor section. A rack-and-pinion drive motor is in mechanical communication with the rack-and-pinion gear mechanism to provide the driving force to the adjustable conveyor section. A conveyor belt drive roller is rotatably attached of the fixed conveyor section and a conveyor belt drive motor in mechanical communication with the conveyor belt drive roller to drive a single serpentine conveyor belt. A plurality of idle rollers is rotatably attached to ends of the fixed conveyor section and the adjustable conveyor section. The conveyor belt extends around the conveyor drive roller and the plurality of idle rollers, wherein the conveyor belt extends as the distal end of the adjustable conveyor section extends and retracts as the distal end of the adjustable conveyor retracts by movement at least one of the plurality of idle rollers. A plurality of support rollers is rotatably attached along both the fixed conveyor section and the adjustable conveyor section to support the conveyor belt between the plurality of idle rollers.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 5 is a perspective view of the conveyor sections in combination depicted in the deployed state, according to the preferred embodiment;

FIG. 7 is a perspective view of a belt tensioning mechanism, according to the preferred embodiment; and, FIG. 8 is a block diagram illustrating the major control sub-systems of the adjustable conveyor assembly, according to the preferred embodiment.

DESCRIPTIVE KEY

Figure 1:
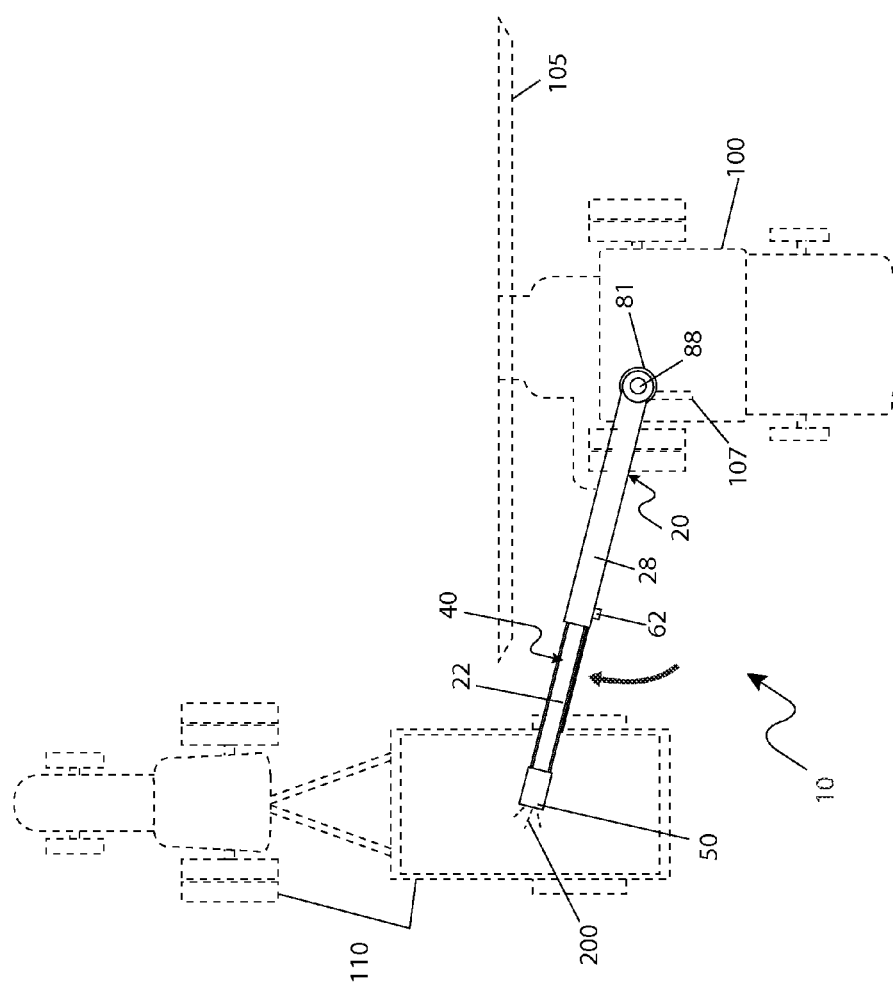
FIG. 1 is a top environmental view of an adjustable conveyor assembly attachable to a combine, according to a preferred embodiment in accordance with the invention.

| | |
|---|---|
| 10 | adjustable conveyor assembly |
| 20 | fixed conveyor section |
| 22 | conveyor belt |
| 24 | position sensor |
| 26 | support roller |
| 27 | support roller axle |
| 28 | fixed conveyor cover |
| 29 | fixed conveyor frame |
| 40 | adjustable conveyor section |
| 44 | adjustable conveyor frame |
| 46 | conveyor roller |
| 48 | conveyor roller track |
| 50 | chute |
| 60 | conveyor belt drive roller |
| 62 | conveyor belt drive motor |
| 63 | first solenoid valve |
| 66 | first idle roller |
| 68 | second idle roller |
| 70 | third idle roller |
| 72 | fourth idle roller |
| 76 | tension roller |
| 78 | belt tensioning mechanism |
| 80 | replacement vertical auger assembly |
| 81 | mounting flange |
| 82 | screw |
| 84 | shaft |
| 85 | coupling |
| 86 | paddle |
| 88 | top shaft bearing |
| 90 | rack-and-pinion gear mechanism |
| 92 | rack-and-pinion drive motor |
| 93 | second solenoid valve |
| 100 | combine |
| 105 | combine cutter head |
| 107 | swivel cylinder |
| 109 | auger housing |
| 110 | unload cart |
| 115 | tractor |
| 120 | roller shaft |
| 122 | spring |
| 124 | eyebolt |
| 125 | nut fastener |
| 126 | bracket |
| 140 | control module |
| 142 | electronic enclosure |
| 144 | digital display |
| 146 | keypad |
| 148a | increment button |
| 148b | decrement button |
| 150 | speaker |
| 152 | ON/OFF switch |
| 200 | harvested material |

DETAILED DESCRIPTION OF THE PREFERRED EMBODIMENT

In accordance with the invention, the best mode is presented in terms of a preferred embodiment, herein depicted within FIGS. 1 through 8. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one particular configuration may be shown and described for purposes of clarity and disclosure and not by way of limitation of scope.

The terms "a" and "an" herein do not denote a limitation of quantity, but rather denote the presence of at least one of the referenced items.

Referring now to FIGS. 1 through 8, depicting an adjustable conveyor assembly (herein described as an "apparatus") 10 attachable to and for use with a harvesting combine 100, where like reference numerals represent similar or like parts. In accordance with the invention, the present disclosure describes a length adjustable conveyor assembly for conveyance of harvested materials 200 being unloaded from a conventional combine 100. The apparatus 10 is intended to replace the conventional auger-type unload system of the combine 100. The apparatus 10 is controlled by a control module 140 within a cab of the combine 100. The apparatus 10 is preferably introduced in various models which are retrofitted to popular corresponding makes and models of combines 100 or incorporated into new combines 100.

FIG. 1 shows a top environmental view of the apparatus 10. The apparatus 10 includes a fixed conveyor section 20 and an adjustable conveyor section 40. The fixed 20 and adjustable 40 conveyor sections are slidingly attached to each other along a common axis and provide for a direct replacement of an original horizontal auger section of an existing combine 100.

The fixed conveyor section 20 is preferably bolted to a flange portion of a vertical auger housing 109 to provide delivery of corn, grain, and other harvested materials 200, to an unload cart 110 typically pulled by a tractor 115. The fixed conveyor section 20 includes a protective cylindrical fixed conveyor cover 28 in the form of a rugged formed metal structure. The fixed conveyor cover 28 includes a mounting flange 81 having matching mating features to be fastened to the flange portion of the vertical auger housing 109. Connection to the vertical auger housing 109 enables the fixed 20 and adjustable 40 conveyor sections to utilize the swivel function of the vertical auger housing 109 to swing the conveyor sections 20, 40 outwardly from the combine 100. The swivel function is selectively activated and controlled by an operator by remote activation of an existing swivel cylinder 107 from within a cab of the combine 100 (see FIG. 3).

When the apparatus 10 is installed and operational, the harvested materials 200 are transported from a storage bin within the combine 100 by a replacement vertical auger assembly 80 which is in communication with the fixed conveyor section 20. The harvested materials 200 are conveyed to the unload cart 110 by the adjustable conveyor section 40 while the combine 100 maintains continuous motion while performing the cutting process.

Figure 2A:
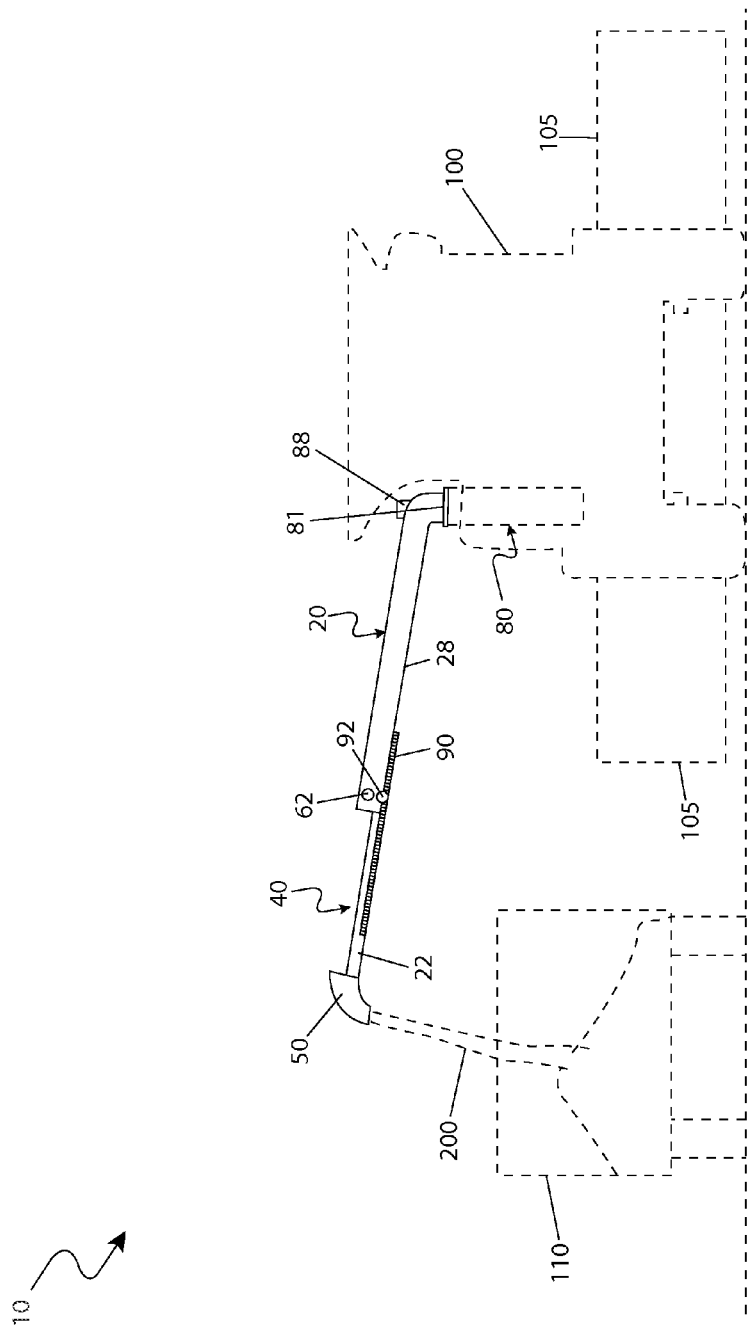
FIG. 2a is a rear view of the adjustable conveyor assembly depicted in a fully deployed state, according to the preferred embodiment.
Figure 2B:
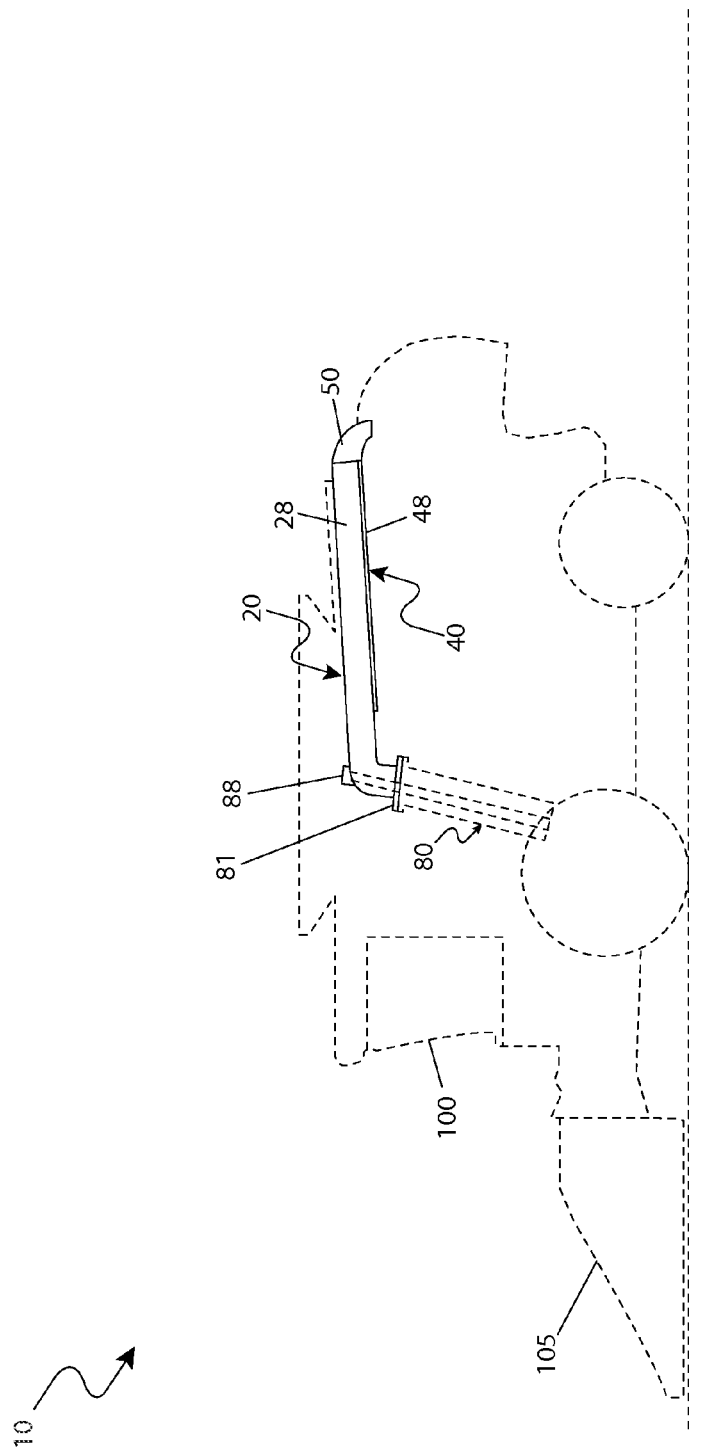
FIG. 2b is a side view of the adjustable conveyor assembly depicted in a retracted state, according to the preferred embodiment.
Figure 3:
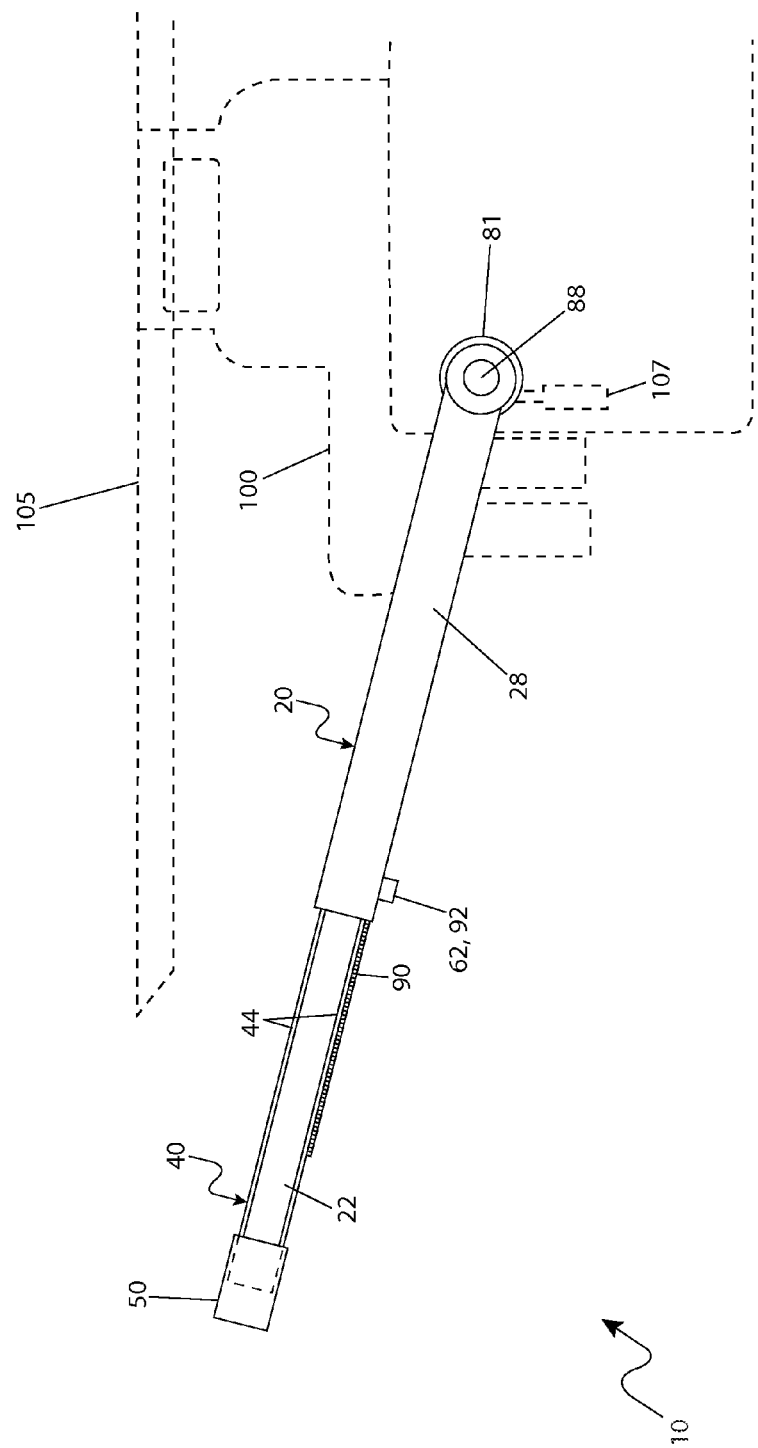
FIG. 3 is a close-up top view of the adjustable conveyor assembly, according to the preferred embodiment.

FIGS. 2*a*, 2*b* and 3 show a rear, a side, and a top view of the apparatus 10, respectively. FIGS. 2*a* and 3 depict the apparatus in a deployed state and FIG. 2*b* depicts the apparatus 10 in a retracted state. The apparatus 10 generally provides a means to transport corn, grain, or other harvested materials 200 to the unload cart 110 over the fixed 20 and the adjustable 40 conveyor sections in combination. The apparatus 10 is capable of delivering the harvested materials 200 at variable distances from the combine 100 through operator selectable extending or retracting of the adjustable conveyor section 40 in relation to the fixed conveyor section 20. The adjustable conveyor section 40 is motioned in a linear manner by a rack-and-pinion gear mechanism 90 and a rack-and-pinion drive motor 92. The rack-and-pinion gear mechanism 90 retracts and extends the adjustable conveyor section 40 relative to the fixed conveyor section 20, which reduces a rearward overhang hazard when compared to the original auger version. The apparatus 10 also includes the replacement vertical auger assembly 80 which is attached between the fixed conveyor section 20 and the combine 100 and provides vertically conveyance of the harvested materials 200 to the fixed conveyor section 20 (see FIGS. 4a and 4b).

Figure 4A:
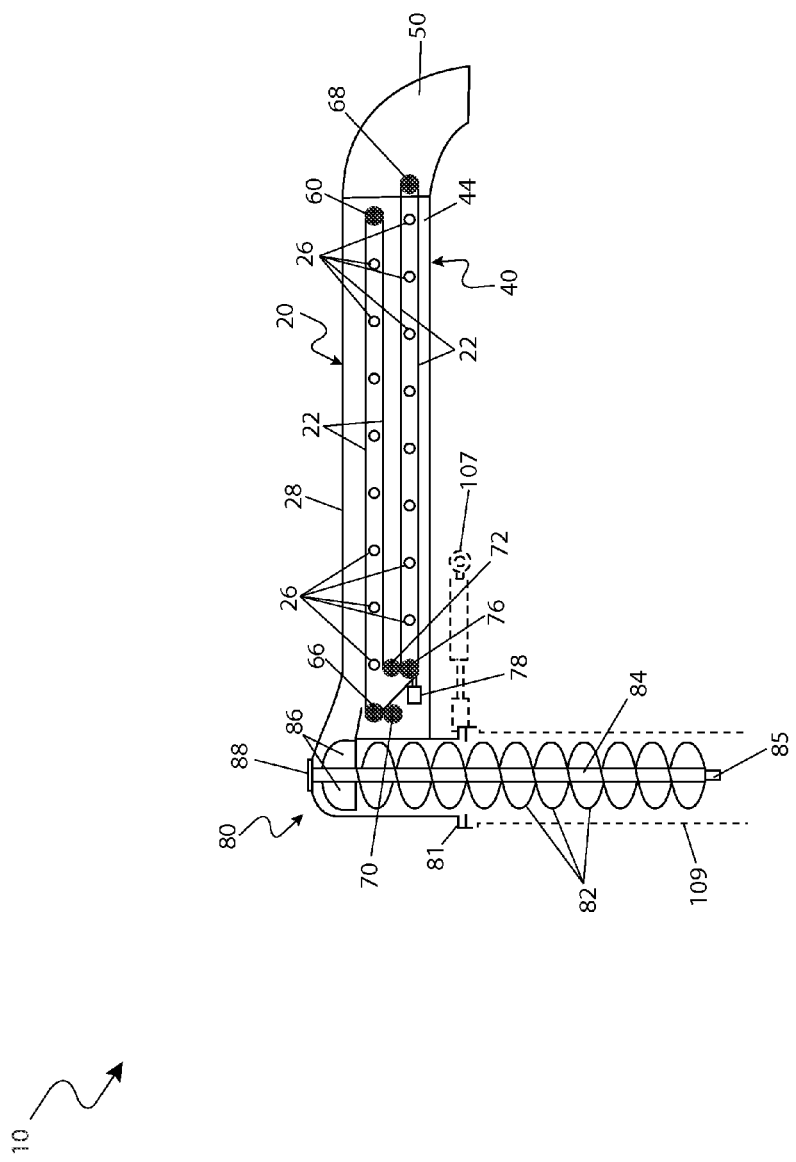
FIG. 4a is a cut-away view of a adjustable conveyor assembly depicted in a retracted state, according to the preferred embodiment.
Figure 4B:
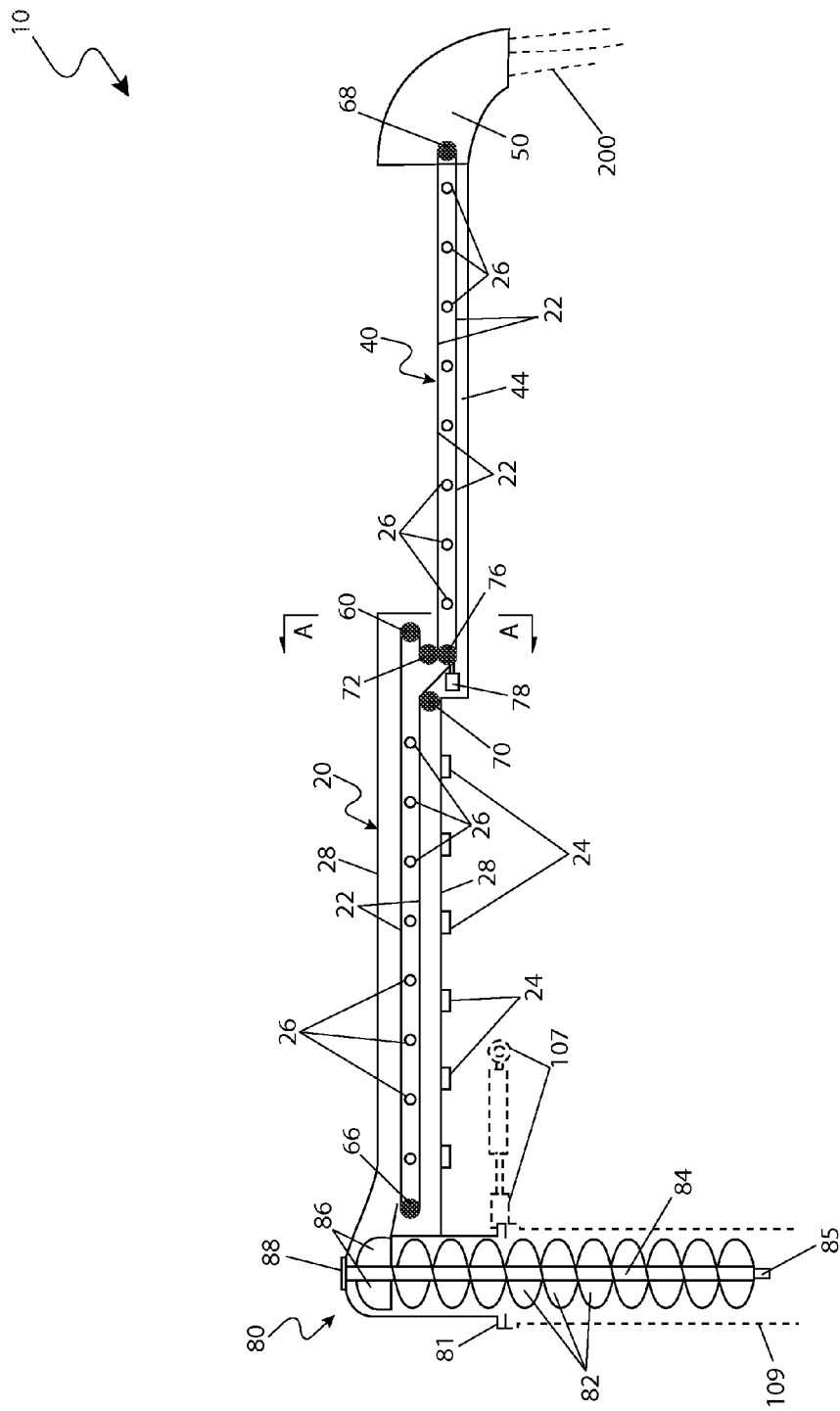
FIG. 4b is a cut-away view of the adjustable conveyor assembly depicted in a deployed state, according to the preferred embodiment.

FIGS. 4a and 4b show cut-away views of the fixed length 20 and adjustable length 40 conveyor sections in the fully retracted state and the fully deployed state, respectively. The conveyor sections 20, 40 slidingly engage each other along a common axis providing a maximum combined extended length of approximately twenty-five (25) feet and a minimum retracted length which is preferably coincidental with a rear end of the combine 100 when swiveled to a longitudinal position as illustrated in FIG. 2b. The apparatus 10 includes a single serpentine conveyor belt 22 which is routed within the combined lengths of both conveyor sections 20, 40. The fixed conveyor section 20 remains stationary during extension of the adjustable conveyor section 40. The adjustable conveyor section 40 is coupled to outer bottom edges of the fixed conveyor section 20 and is longitudinally movable below the fixed conveyor section 20, thereby providing a smooth transfer of harvested materials 200 between the conveyor sections 20, 40.

As the adjustable conveyor section 40 is retracted beneath the fixed conveyor section 20, the serpentine conveyor belt 22 is looped around both the fixed conveyor section 20 and the adjustable conveyor section 40. The adjustable conveyor section 40 is retracted below the fixed conveyor section 20 to maintain a constant total length of the conveyor belt 22 and allowing the apparatus 10 to operate using a single continuous length of conveyor belt 22. The conveyor belt 22 is preferably a flat belt design approximately sixteen (16) to twenty (20) inches in width and made using commercially available heavy-duty rubber conveyor belt stock with reinforced laminated textile portions common in the industry.

A load-bearing top portion of the conveyor belt 22 is supported by a plurality of equally-spaced axial support rollers 26. The conveyor belt 22 are motioned by a conveyor belt drive roller 60 and a direct-drive hydraulic conveyor belt drive motor 62 located at a distal end of the fixed conveyor section 20. The conveyor belt 22 is routed and redirected within the fixed conveyor section 20 at a proximal end by a first idle roller 66 and at a distal end by the conveyor belt drive roller 60. The conveyor belt 22 is routed and redirected within the adjustable conveyor section 40 in a like manner by a second idle roller 68 at a distal end and third 70 and a fourth 72 idle rollers at a proximal end, which facilitate the subjacent storage position below the fixed conveyor section 20.

The replacement vertical auger assembly 80 provides a means to transport the harvested material 200 upwardly from the storage bin of the combine 100 and onto the fixed conveyor section 20. The replacement vertical auger assembly 80 physically replaces any original auger and auger gear drives of the combine 100. The replacement vertical auger assembly 80 is installed within the vertical auger housing 109 following removal of the original auger portions of the combine 100. The replacement vertical auger assembly 80 provides equipment which effectively interfaces with the fixed conveyor cover 28 to enable conveyance of the harvested material 200 to the fixed conveyor section 20. The replacement vertical auger assembly 80 provides similar construction and functionality as the original auger portion including a screw 82 and a center auger shaft 84. The replacement vertical auger assembly 80 also includes an integral coupling 85 located at a bottom end of the shaft 84 which provides rotary mechanical engagement with the auger drive of the combine 100. The auger shaft 84 includes a pair of rectangular paddles 86 being welded to opposing sides of the shaft 84. The shaft 84 also includes a top shaft bearing 88 incorporated into the fixed conveyor cover 28, which provides centering and support of the screw 82 and shaft 84 of the replacement vertical auger assembly 80.

The adjustable conveyor section 40 includes a chute 50 affixed to an outward end by attachment methods such as fasteners or welding. The chute 50 provides similar construction, materials, and function as chutes found on conventional auger style combines 100. The chute 50 includes a rugged arcuate metal conduit providing downward redirection of the harvested materials 200 during exiting from the adjustable conveyor section 40 and subsequent entering into the unload cart 110 as it is pulled by a tractor 115 (see FIG. 1).

Figure 6:
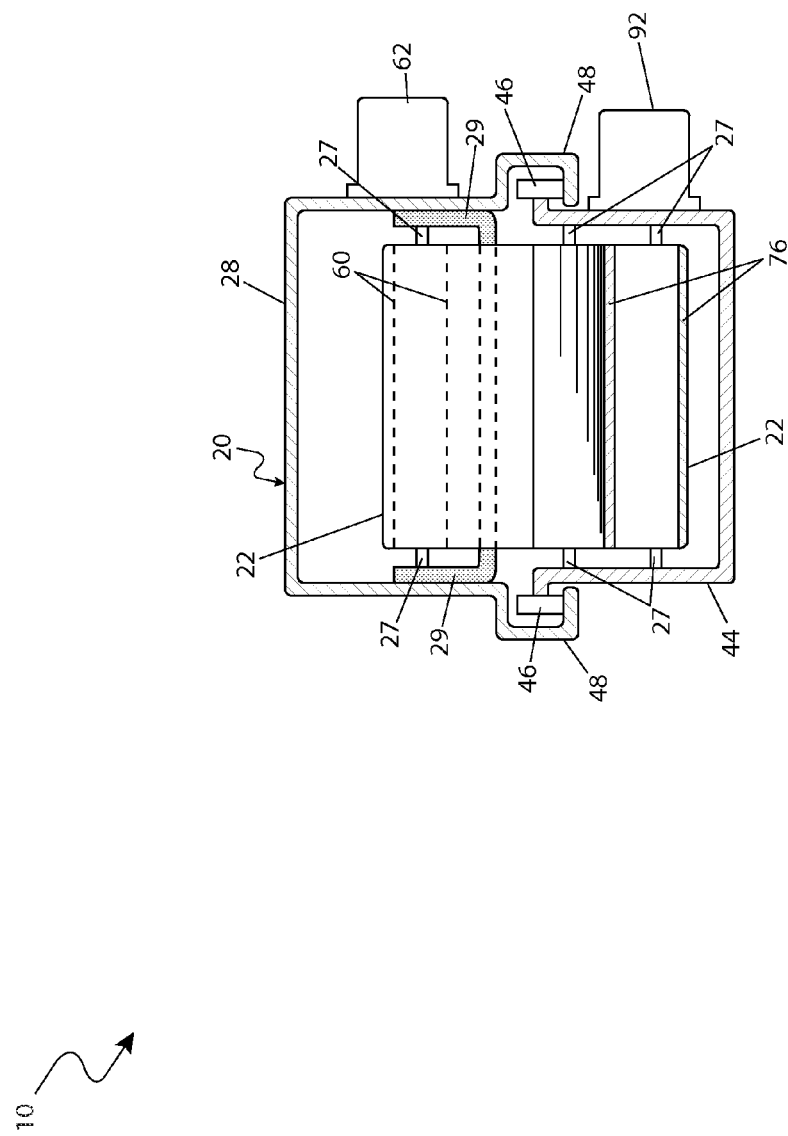
FIG. 6 is a section view of the conveyor sections in combination taken along section line A-A of FIG. 4*b*, according to the preferred embodiment.

FIGS. 5 and 6 show a perspective and a section view of the fixed conveyor section 20 and adjustable-length conveyor sections 40. The fixed conveyor section 20 and the adjustable conveyor section 40 include a rigid fixed conveyor cover 28 and an adjustable conveyor frame 44, respectively, which provide structural integrity and attachment surfaces to the associated rollers 60, 66, 68, 70, 72, 76 and the conveyor belt 22 and a plurality of belt support rollers 26 which are subjacent to the conveyor belt 22. The fixed conveyor cover 28 has been cut away from a fixed conveyor frame 29 in FIG. 5 for clarity of illustration. The plurality of equally-spaced support rollers 26 are rotatably fastened between opposing side walls of the fixed conveyor frame 29 and the adjustable conveyor frame 44. The support rollers 26 provide uniform support to the load-bearing portions of the conveyor belt 22. The support rollers 26 include axially-supported elongated cylindrical members having respective support roller axles 27 which pass though a long center of each support roller 26 and are rotatingly inserted into and supported by the fixed conveyor frame 29 and the adjustable conveyor frame 44 to maintain a level top surface of the conveyor belt 22.

The adjustable conveyor section 40 provides sliding engagement with the fixed conveyor section 20 in a telescoping manner allowing extension and retraction of the adjustable conveyor section 40 in a cantilever manner. The adjustable conveyor section 40 includes a plurality of equally-spaced conveyor rollers 46 extending horizontally outward from upper outer edge portions as seen in section view FIG. 6. The conveyor rollers 46 are arranged in a linear fashion, each being entrapped within respective "U"-shaped conveyor roller tracks 48 which are integrally formed into lower outer edge portions of the fixed conveyor frame 29, thereby allowing smooth motioning of the adjustable conveyor section 40 to provide a selective overall length.

FIG. 7 shows a perspective view of a belt tensioning mechanism portion 78. The adjustable conveyor section 40 includes the belt tensioning mechanism 78 located at the proximal end. The belt tensioning mechanism 78 is in mechanical communication with end portions of a roller shaft 120 of the tension roller 76 to provide an independent side-to-side tension force and also provide compliant spring tensioning of the conveyor belt 22. The belt tensioning mechanism 78 includes a pair of parallel tension springs 122, a pair of adjustable eyebolts 124 and corresponding nut fasteners 125, and a pair of anchoring brackets 126 affixed to the adjustable conveyor frame 44 using fasteners or welding. The tensioning mechanism 78 provides a way to selectively apply perpendicular and side-to-side tension to the tension roller 76, thereby maintaining proper tension and alignment of the conveyor belt 22. However, it is appreciated that the apparatus 10 is not limited to the illustrated tensioning mechanism design 78 and that various other belt tensioning mechanisms may be utilized without deviating from the scope of the disclosure and as such should not be interpreted as a limiting factor of the apparatus 10.

FIG. 8 is a block diagram illustrating the major control sub-systems required for operation of the apparatus 10. The apparatus 10 provides a user interface control module 140 preferably installed within the cab of the combine 100 at a convenient location, such as upon a dashboard or console. The control module 140 provides various manual and automatic functionality to the apparatus 10 such as, but not limited to: ON/OFF switching, automatic/manual switching, operational status displaying, alert/alarm audio signaling, and the like. The control module 140 includes an industrial-duty electronic enclosure 142 including expected user interface features such as, but not limited to: a digital display 144, an alpha-numeric keyboard 146, an increment button 148a, a decrement button 148b, a miniature piezo speaker 150, and an ON/OFF switch 152. The control module 140 further includes internal electrical and electronic equipment such as, but not limited to: printed circuit boards, microprocessors, memory chips, embedded software, relays, input/output signal circuitry, and the like.

The apparatus 10 also includes a conveyor drive motor 62 and the rack-and-pinion drive motor 92 which include standard direct-drive hydraulic motor units powered by a first solenoid valve 63 and a second solenoid valve 93, respectively. The solenoid valves 63, 93 are preferably plumbed into an existing hydraulic system of the combine 100 to receive a supply of pressurized hydraulic fluid to drive the motors 62, 92. The control module 140 provides respective output signals to the first 63 and second 93 solenoid valves based upon manual user activation or automatic software activation to drive the respective motors 62, 92.

The control module 140 also monitors an extended length of the adjustable conveyor section 40 via input signals from a plurality of equally-spaced sensors 24 affixed along the fixed conveyor section 20 (see FIG. 4b). The sensors 24 provide input signals to the control module 140 enabling automatic or manual positioning of the adjustable conveyor section 40 based upon activation by the control module 140.

It can be appreciated by one skilled in the art that the electronic and electrical equipment within the control module 140 are capable of providing various automatic functions such as, but not limited to: automatic extension of the adjustable conveyor section 40 based upon user input instructions, automatic emptying of harvested materials 200 from the conveyor sections 20, 40 by software timers, single-button activation of pre-programmed conveyor functions, and the like. It is further understood that some or all of the functions of the control module 140 may either work in conjunction with or be integrated into existing hardware and software portions of an existing control system of the combine 100 and as such should not be interpreted as a limiting factor of the apparatus 10.

An alternative embodiment includes integration of the apparatus 10 into new makes and models of combines 100 as original equipment. Such an embodiment of the apparatus 10 provides incorporation of the equipment and functions of the apparatus 10 into a design of the material handling equipment, hydraulic system, and control systems of the new combines 100.

It is envisioned that other styles and configurations can be easily incorporated into the teachings of the present disclosure and only one particular configuration has been shown and described for purposes of clarity and disclosure and not by way of limitation of scope.

In accordance with the invention, the preferred embodiment can be utilized by the user in a simple and effortless manner with little or no training. After initial purchase or acquisition of the apparatus 10, it would be installed as indicated in FIGS. 1 through 2b.

The method of installing the apparatus 10 upon an existing combine 100 may be achieved by performing the following steps: purchasing a model of the apparatus 10 which corresponds to a particular model of an existing combine 100 into which the apparatus 10 is to be installed; removing original portions of the existing combine 100 including the vertical auger screw, the horizontal auger assembly, and respective conjoining drive components; installing the vertical auger assembly 80 into the existing auger housing 109; pre-assembling the fixed conveyor section 20, the adjustable conveyor section 40, and the conveyor belt 22, if not previously assembled; bolting the mounting flange 81 of the fixed conveyor 20 to the flange portion of the vertical auger housing 109; mounting and plumbing the first 63 and second 93 solenoid valves to the existing hydraulic system of the combine 100; making all hydraulic connections between the drive 62 and rack-and-pinion 92 drive motors, and the first 63 and second 93 solenoid valves; installing the control module 140 within the cab portion of the combine 100; and, making all electrical connections between the control module 140 and the sensors 24, the solenoid valves 63, 93, a DC power source, and the like.

The method of utilizing the apparatus 10 may be achieved by performing the following steps: activating the apparatus 10 by pressing the ON/OFF switch 152; completely retracting the adjustable conveyor section 40 using the features and software functions of the control module 140; swiveling the conveyor sections 20, 40 to a rearward stowed position using the features and software functions of the control module 140; piloting the combine 100 in a normal manner to a crop location to be harvested 200; harvesting materials 200 such as corn or grain in a normal manner; preparing to unload the harvested materials 200 by swiveling the conveyor sections 20, 40 outwardly to a position approximately perpendicular to the combine 100 using the existing swivel equipment and controls; extending the adjustable conveyor section 40 outwardly to a desired length using the features and software functions of the control module 140; positioning the unload cart 110 under the chute 50; starting a motioning of the conveyor sections 20, 40 using the features and software functions of the control module 140; starting a motioning of the replacement vertical auger assembly 80 using existing control portions of the combine 100; unloading the harvested materials 200 into the cart 110 until the cart 110 is full or the bin portion of the combine 100 is empty; repeating the above steps as necessary to complete a crop harvesting task; and, benefiting from improved unloading versatility and reduced rearward overhang of the unload conveyor sections 20, 40 while using the apparatus 10.

The method of utilizing the alternate original-equipment version of the apparatus 10 within a new combine design 100 would allow a user to operate the combine 100 in a normal manner while benefiting from the improved unloading functionality and equipment compactness provided by the adjustable conveyor section 40 of the apparatus 10.

The foregoing descriptions of specific embodiments have been presented for purposes of illustration and description.

They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. An adjustable conveyor assembly attachable to a combine for transporting harvested material from a combine bin, said assembly comprising:
   a vertical auger assembly attachable to said combine bin to transport said harvested material upwardly from said combine bin;
   a telescoping conveyor assembly adapted to transport said harvested material away from said combine bin comprising a fixed conveyor section having a proximal end fastened to an upper end of said vertical auger assembly to receive said harvested material and a distal end and an adjustable conveyor section having a proximal end slidingly coupled to said fixed conveyor section and a distal end outwardly extendable relative to said fixed conveyor section;
   a conveyor belt continuously looped around said telescoping conveyor assembly for carrying said harvested material;
   a belt tensioning mechanism disposed at said proximal end of said adjustable conveyor section to provide a tensile force upon said conveyor belt;
   a conveyor section drive assembly to extend and retract said adjustable conveyor section relative to said fixed conveyor section;
   a conveyor belt drive assembly to move said conveyor belt around said telescoping conveyor assembly;
   a user interface control module to provide a plurality of operational control functions to said conveyor section drive assembly and said conveyor belt drive assembly; and,
   a plurality of sensors disposed upon a lower side of said fixed conveyor frame to provide an input signal to said control module in response to incremental linear motion of said adjustable conveyor section relative to said fixed conveyor section.

2. The assembly of claim 1, wherein said conveyor section drive assembly further comprises:
   a rack-and-pinion gear mechanism for linearly moving said adjustable conveyor section relative to said fixed conveyor section; and,
   a rack-and-pinion drive motor disposed on said distal end of said fixed conveyor section and in mechanical communication with said rack-and-pinion gear mechanism.

3. The assembly of claim 1, wherein said fixed conveyor section further comprises:
   an elongated fixed conveyor frame;
   a plurality of support rollers rotatably attached between opposing sides of said fixed conveyor frame to support said conveyor belt; and,
   a fixed conveyor cover affixed around said fixed conveyor frame to cover said conveyor belt; and,
   wherein said adjustable conveyor section further comprises:
   an elongated adjustable conveyor frame; and,
   a plurality of support rollers rotatably attached between opposing sides of said adjustable conveyor frame to support said conveyor belt.

4. The assembly of claim 1, wherein said conveyor belt drive assembly further comprises:
   a conveyor belt drive roller rotatably attached between opposing sides of said fixed conveyor frame of said distal end of said fixed conveyor section;
   a conveyor belt drive motor in mechanical communication with said conveyor belt drive roller;
   a first idle roller rotatably attached between opposing sides of said fixed conveyor frame on said proximal end of said fixed conveyor section;
   a second idle roller rotatably attached between opposing sides of said adjustable conveyor frame on said distal end of said adjustable conveyor section;
   a third idle roller rotatably attached between opposing sides of said adjustable conveyor frame on said proximal end of said adjustable conveyor section; and,
   a fourth idle roller rotatably attached between opposing sides of said adjustable conveyor frame on said proximal end of said adjustable conveyor section;
   wherein said conveyor belt extends from said conveyor belt drive roller to said fourth idle roller to said second idle roller to said third idle roller to said first idle roller and back to said conveyor belt drive roller; and,
   wherein said conveyor belt extends as said distal end of said adjustable conveyor section extends and retracts as said distal end of said adjustable conveyor retracts by movement of said third idle roller and said fourth idle roller.

5. The assembly of claim 4, wherein said conveyor belt drive assembly further comprises a belt drive solenoid valve in fluid communication between said hydraulic system of said combine and said conveyor belt drive motor;
   wherein said belt drive solenoid valve is controlled by said control module.

6. The assembly of claim 1, wherein said belt tensioning mechanism further comprises:
   a tension roller rotatably attached between opposing sides of said proximal end of said adjustable conveyor frame;
   a pair of tension springs connected to ends of said tension roller;
   a pair of tension fasteners connected to ends of said pair of tension springs; and,
   a pair of anchoring brackets affixed to said adjustable conveyor frame and connected to ends of said pair of tension fasteners opposite said pair of tension springs;
   wherein each of said pair of tension springs and tension fasteners in combination provide independent adjustment to each opposing side of said tension roller.

7. The assembly of claim 3, wherein said conveyor section drive assembly further comprises:
   a rack-and-pinion gear mechanism for linearly moving said adjustable conveyor section relative to said fixed conveyor section;
   a rack-and-pinion drive motor disposed on said distal end of said fixed conveyor section and in mechanical communication with said rack-and-pinion gear mechanism;
   a plurality of conveyor rollers protruding outwardly from sides of said adjustable conveyor frame; and,
   a conveyor roller track disposed on a lower edge of each opposing side of said fixed conveyor section;
   wherein said plurality of conveyor rollers are rotatably movable within said conveyor roller track as said adjustable conveyor section moves relative to said fixed conveyor section.

8. The assembly of claim 7, wherein said conveyor section drive assembly further comprises a section drive solenoid valve in fluid communication between a hydraulic system of said combine and said conveyor section drive motor;

wherein said section drive solenoid valve is controlled by said control module.

9. The assembly of claim 3, wherein said vertical auger assembly further comprises:
an elongated auger shaft disposed within a vertical auger housing of said combine having a lower end portion extending within said combine bin to move said harvested material from said combine bin to said fixed conveyor section;
a coupling disposed on a lower end of said shaft and mechanically coupled to an auger drive of said combine; and,
at least a pair of paddles extending outwardly from an upper end portion of said shaft adjacent to said proximal end of said fixed conveyor section.

10. The assembly of claim 9, wherein said fixed conveyor cover further comprises:
a mounting flange matingly fastened to an upper flanged end of said vertical auger housing; and,
a shaft bearing disposed on said fixed conveyor cover to receive and support an upper end of said auger shaft.

11. An adjustable conveyor assembly attachable to a combine for transporting harvested material from a combine bin comprising:
an elongated auger shaft disposed within a vertical auger housing of said combine, said shaft comprising a lower end mechanically coupled to an auger drive of said combine to move said harvested material upwardly;
an enclosed fixed conveyor section having a proximal end fastened to an upper end of said vertical auger housing to receive said harvested material and a conveyor roller track disposed on a lower edge of each opposing side from said proximal end to a distal end;
an adjustable conveyor section having a plurality of conveyor rollers protruding outwardly from opposing sides extending from a proximal end to a distal end and rotatably movable within said conveyor roller track as said adjustable conveyor section moves relative to said fixed conveyor section;
a rack-and-pinion gear mechanism for linearly moving said adjustable conveyor section relative to said fixed conveyor section;
a rack-and-pinion drive motor disposed on said distal end of said fixed conveyor section and in mechanical communication with said rack-and-pinion gear mechanism;
a conveyor belt drive roller rotatably attached of said fixed conveyor section;
a conveyor belt drive motor in mechanical communication with said conveyor belt drive roller;
a plurality of idle rollers rotatably attached to ends of said fixed conveyor section and said adjustable conveyor section;
a conveyor belt extending around said conveyor drive roller and said plurality of idle rollers, said conveyor belt extends as said distal end of said adjustable conveyor section extends and retracts as said distal end of said adjustable conveyor retracts by movement at least one of said plurality of idle rollers;
a plurality of support rollers rotatably attached along said fixed conveyor section and said adjustable conveyor section to support said conveyor belt;
a belt tensioning mechanism disposed at said proximal end of said adjustable conveyor section to provide a tensile force upon said conveyor belt;
a user interface control module to provide a plurality of operational control functions to said conveyor section drive assembly and said conveyor belt drive assembly; and,
a plurality of sensors disposed upon a lower side of said fixed conveyor frame to provide an input signal to said control module in response to incremental linear motion of said adjustable conveyor section relative to said fixed conveyor section.

12. The assembly of claim 11, further comprising a first solenoid valve in fluid communication between a hydraulic system of said combine and said conveyor section drive motor and a second solenoid valve in fluid communication between said hydraulic system of said combine and said conveyor belt drive motor;
wherein said first solenoid valve and said second solenoid valve are controlled by said control module.

13. The assembly of claim 12, wherein said belt tensioning mechanism comprises:
a tension roller rotatably attached to said proximal end of said adjustable conveyor section;
a pair of tension springs connected to ends of said tension roller;
a pair of tension fasteners connected to ends of said pair of tension springs; and,
a pair of anchoring brackets affixed to said adjustable conveyor frame and connected to ends of said pair of tension fasteners opposite said pair of tension springs;
wherein said conveyor belt extends around said tension roller; and,
wherein each of said pair of tension springs and tension fasteners in combination provide independent adjustment to each opposing side of said tension roller.

14. The assembly of claim 13, wherein said control module provides a plurality of operational control functions to said conveyor section drive motor and said conveyor belt drive motor, said control module comprising:
a digital display;
an alpha-numeric keyboard to receive manual input signals;
an increment button to manually extend said adjustable conveyor section relative to said fixed conveyor section;
a decrement button to manually retract said adjustable conveyor section relative to said fixed conveyor section;
a miniature piezo speaker to provide audible output signals; and,
a power switch.

15. The assembly of claim 14, wherein said adjustable conveyor section further comprises a chute affixed to said distal end to downwardly redirect said harvested material dispensed from said adjustable conveyor section.

* * * * *